United States Patent
Lerosey et al.

(10) Patent No.: US 11,575,429 B1
(45) Date of Patent: Feb. 7, 2023

(54) MULTI-BEAM AND MULTI-POLARIZATION ELECTROMAGNETIC WAVEFRONT SHAPING

(71) Applicant: Greenerwave, Paris (FR)

(72) Inventors: Geoffroy Lerosey, Paris (FR); Uladzislau Papou, Antony (FR); Mikhail Odit, Paris (FR); Jonathan Duquet, Suresnes (FR); Jean-Baptiste Gros, Paris (FR); Victor Barolle, Paris (FR); Rémi Faggiani, Charenton-le-pont (FR)

(73) Assignee: Greenerwave, Paris (FR)

( * ) Notice: Subject to any disclaimer, the term of this patent is extended or adjusted under 35 U.S.C. 154(b) by 0 days.

(21) Appl. No.: 17/861,098

(22) Filed: Jul. 8, 2022

(51) Int. Cl.
  *H04B 7/185* (2006.01)
  *H01Q 15/22* (2006.01)
  *H01Q 15/14* (2006.01)
  *H04W 16/26* (2009.01)

(52) U.S. Cl.
  CPC ....... *H04B 7/18513* (2013.01); *H01Q 15/148* (2013.01); *H01Q 15/22* (2013.01); *H04W 16/26* (2013.01)

(58) Field of Classification Search
  CPC ............. H04B 7/18513; H01Q 15/148; H01Q 15/22; H04W 16/26
  See application file for complete search history.

(56) References Cited

U.S. PATENT DOCUMENTS

| | | | |
|---|---|---|---|
| 7,839,349 B1 * | 11/2010 | West | H01Q 15/148 343/781 CA |
| 8,149,180 B2 | 4/2012 | Thevenot et al. | |
| 11,217,896 B2 | 1/2022 | Legay et al. | |
| 2008/0136563 A1 | 6/2008 | Duwel et al. | |

(Continued)

FOREIGN PATENT DOCUMENTS

| | | |
|---|---|---|
| EP | 2839533 A1 | 2/2015 |
| EP | 3439107 A1 | 2/2019 |

OTHER PUBLICATIONS

Ariel Epstein, et al., "Cavity-excited Huygens' metasurface antennas for near-unity aperture illumination efficiency from arbitrarily large apertures," in Nat Commun 7, 10360 (2016).

(Continued)

*Primary Examiner* — Fred A Casca
(74) *Attorney, Agent, or Firm* — Daylight Law, P.C.

(57) ABSTRACT

Methods and systems for shaping an electromagnetic wavefront are disclosed. A disclosed method includes tuning a tunable surface in an electromagnetic cavity and receiving the electromagnetic wavefront in the electromagnetic cavity. The electromagnetic wavefront includes a first wave defined by a first wavelength and a second wave defined by a second wavelength. The first wave and the second wave have a shared phase and a shared beam direction in the electromagnetic wavefront. The method further includes reflecting the electromagnetic wavefront within the cavity to repeatedly interact with the tunable surface, and transmitting, after reflecting the electromagnetic wavefront within the cavity, (Continued)

the electromagnetic wavefront from the electromagnetic cavity as a shaped electromagnetic wavefront. The first wave and the second wave have at least one of a difference in phase or a difference in beam direction in the shaped electromagnetic wavefront.

30 Claims, 13 Drawing Sheets

(56) References Cited

U.S. PATENT DOCUMENTS

2020/0043522 A1 2/2020 Damaghi et al.
2021/0313701 A1 10/2021 Lerosey et al.

OTHER PUBLICATIONS

Jean-Baptiste Gros, et al., "A Reconfigurable Intelligent Surface at mmWave Based on a Binary Phase Tunable Metasurface", Greenerwave, ESPCI Paris, May 5, 2021.
Jean-Baptiste Gros, et al., "A Wave Physics Approach to Electronically Steerable Antennas", Greenerwave, 35th Annual Small Satellite Confernce, Jul. 2021.
Yuanwei Liu, et al., "Reconfigurable Intelligent Surfaces: Principles and Opportunities," in IEEE Communications Surveys & Tutorials, vol. 23, No. 3, pp. 1546-1577, thirdquarter 2021.

* cited by examiner

700

701

702

703

704

900

RHCP beam 1 at frequency 1

LHCP beam 2 at frequency 2

MULTI-BEAM AND MULTI-POLARIZATION ELECTROMAGNETIC WAVEFRONT SHAPING

BACKGROUND

A wavefront shaping device is a device that can control the propagation or reflection of electromagnetic waves. Wavefront shaping devices have improved in the recent past due to the development of metasurfaces. These metasurfaces are programmable structures comprising a plurality of cells where each cell can be configured to control the propagation of electromagnetic waves. For example, the cells could alter the reflectance of the metasurface in an area occupied by the cell. In combination, the unit cells can control the amplitude, phase, polarization and direction of an electromagnetic wave which impinges on, and is reradiated by, the metasurface. The reradiation of the electromagnetic wave from the metasurface can be a reflection off the metasurface. In these situations, the metasurface can be referred to as a reflectarray. The reradiation of the electromagnetic wave from the metasurface can also be through the metasurface. In these situations, the metasurface can be referred to as a transmitarray. Certain metasurfaces can both reradiate through the metasurface and from the metasurface.

SUMMARY

Systems and methods directed to electromagnetic wavefront shaping are disclosed herein. The systems and methods disclosed herein can include a tunable surface in an electromagnetic cavity which is used to shape an electromagnetic wavefront that impinges upon the tunable surface. The cavity can be referred to as an electromagnetic cavity because boundaries of the cavity interact with electromagnetic waves and cause reflections of those electromagnetic waves within the cavity.

Throughout this disclosure the terms "electromagnetic wavefront" and "electromagnetic wavefront shaping" are used with reference to a process in which control is exerted over the wave pattern of an electromagnetic wavefront. The electromagnetic wavefront can be conceptualized as including a collection of electromagnetic waves at different frequencies spread out across the bandwidth of the electromagnetic wavefront. In turn, shaping the electromagnetic wavefront by controlling the wave pattern of the wavefront can be conceptualized as altering one or more of a direction, polarity, amplitude, and phase of one or more of the constituent electromagnetic waves of said wavefront.

In specific embodiments of the invention, the placement of a tunable surface in a cavity allows for the electromagnetic wavefront shaping of an electromagnetic wavefront via the simultaneous and independent control of two or more different constituent electromagnetic waves of that electromagnetic wavefront at two or more different frequencies. Without the use of a cavity, all frequencies within the bandwidth of operation of a given tunable surface are generally modified in the same way by the tunable surface. However, when a tunable surface is placed inside a cavity, the multiple reflections inside the cavity create a highly disparate physical phenomenon. If two frequencies are outside the coherence range of the cavity, the electromagnetic response at each frequency is sufficiently different to create intentional separation of the electromagnetic waves at each frequency. Using this approach, it is possible for the electromagnetic wavefront shaping system to independently control a wave pattern of the electromagnetic waves at those two frequencies (e.g., in either direction or in polarization). These approaches take advantage of the usually undesirable decoherence property of wavefront shaping devices to control the waves at both frequencies simultaneously and independently.

While the example of two electromagnetic waves at different frequencies being independently controlled is used as an example throughout this disclosure, the disclosed principle is more broadly applicable to separate and independent control of a plurality of electromagnetic waves at different frequencies in a given electromagnetic wavefront. Furthermore, while the example of two electromagnetic waves with a shared beam direction (e.g., having a main lobe) being independently controlled is used as an example throughout this disclosure, the disclosed principle is broadly applicable to electromagnetic waves having a plurality of lobes. Furthermore, while the examples are given in one direction, where two electromagnetic waves at different frequencies are independently controlled to be separated, the techniques disclosed herein can be applied with the propagation direction is reversed (e.g., two electromagnetic waves at different frequencies with different beam directions being independently controlled to be combined into a single beam).

Specific embodiments of the systems and methods disclosed herein can be used in the context of various systems and applications including in radars, communication antennas, and signal modifiers such as a reconfigurable intelligent surface (RIS). As an example of an antenna application, an electromagnetic wavefront shaping system in accordance with specific embodiments of the disclosures herein could be illuminated by a feeding antenna, or other source of electromagnetic waves, and the characteristics of a tunable surface of that electromagnetic wavefront shaping system could be modified to shape the signal transmitted by the communication antenna. Such an electromagnetic wavefront shaping system could be attached to a satellite or a terrestrial antenna. More generally, an electromagnetic wavefront shaping system in accordance with specific embodiments of the disclosures herein could be used to control the emission or reception beam of a device in a communications network such as in a wireless access point (e.g., a router, base station, or relay). As an example of a radar application, an electromagnetic wavefront shaping system in accordance with specific embodiments of the disclosures herein could be used in a beamforming antenna in a radar application to form three-dimensional images of a target by shaping different scanning patterns to apply to the target. As an example of a signal modifier application, an electromagnetic wavefront shaping system in accordance with specific embodiments of the disclosures herein can have a sufficiently low operating costs compared to traditional beamforming technologies such that it can be used as an RIS. An RIS or set of RISs can be used within the range of a wireless network to increase the performance of the network. For example, a set of RISs could be used within a building and dynamically adjust their configurations to distribute the signals of the wireless network most effectively throughout the building.

In specific embodiments of the invention, a method for shaping an electromagnetic wavefront is provided. The method includes tuning a tunable surface in an electromagnetic cavity. The method also includes receiving the electromagnetic wavefront in the electromagnetic cavity. The electromagnetic wavefront includes a first wave defined by a first wavelength and a second wave defined by a second wavelength. The first wave and the second wave have a shared polarization and a shared beam direction in the electromagnetic wavefront. The method also includes reflecting the electromagnetic wavefront within the cavity to repeatedly interact with the tunable surface and transmitting, after reflecting the electromagnetic wavefront within the cavity, the electromagnetic wavefront from the electromagnetic cavity as a shaped electromagnetic wavefront. The first wave and the second wave have at least one of a difference in polarization or a difference in beam direction in the shaped electromagnetic wavefront.

In specific embodiments of the invention, a system for shaping an electromagnetic wavefront is provided. The system includes an electromagnetic cavity having at least one semitransparent electromagnetic boundary. The system also includes a tunable surface in the electromagnetic cavity, at least one processor, and at least one computer readable medium storing instructions. The instructions, when executed by the at least one processor, cause the system to tune the tunable surface in the electromagnetic cavity; receive an electromagnetic wavefront in the electromagnetic cavity, wherein the electromagnetic wavefront includes a first wave defined by a first wavelength and a second wave defined by a second wavelength, and wherein the first wave and the second wave have a shared polarization and a shared beam direction in the electromagnetic wavefront; reflect the electromagnetic wavefront within the cavity; and transmit, after reflecting the electromagnetic wavefront within the cavity, the electromagnetic wavefront from the electromagnetic cavity through the at least one semitransparent electromagnetic boundary as a shaped electromagnetic wavefront, wherein the first wave and the second wave have at least one of a difference in polarization or a difference in beam direction in the shaped electromagnetic wavefront.

In specific embodiments of the invention, a method for shaping an electromagnetic wavefront is provided. The method includes tuning a tunable surface in an electromagnetic cavity, receiving, in the electromagnetic cavity, electromagnetic energy comprising electromagnetic waves having a set of frequencies, a shared polarization, and a shared beam direction. The method also includes reflecting the set of electromagnetic waves within the cavity such that the electromagnetic waves repeatedly interact with the tunable surface. The method also includes transmitting, out of the electromagnetic cavity and after reflecting the set of electromagnetic waves within the cavity, at least a portion of the electromagnetic energy comprising electromagnetic waves having the set of frequencies and at least one of: (i) a set of differing polarization; and (ii) a set of differing beam directions.

DETAILED DESCRIPTION

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different methods and systems for electromagnetic wavefront shaping will be described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Figure 1:
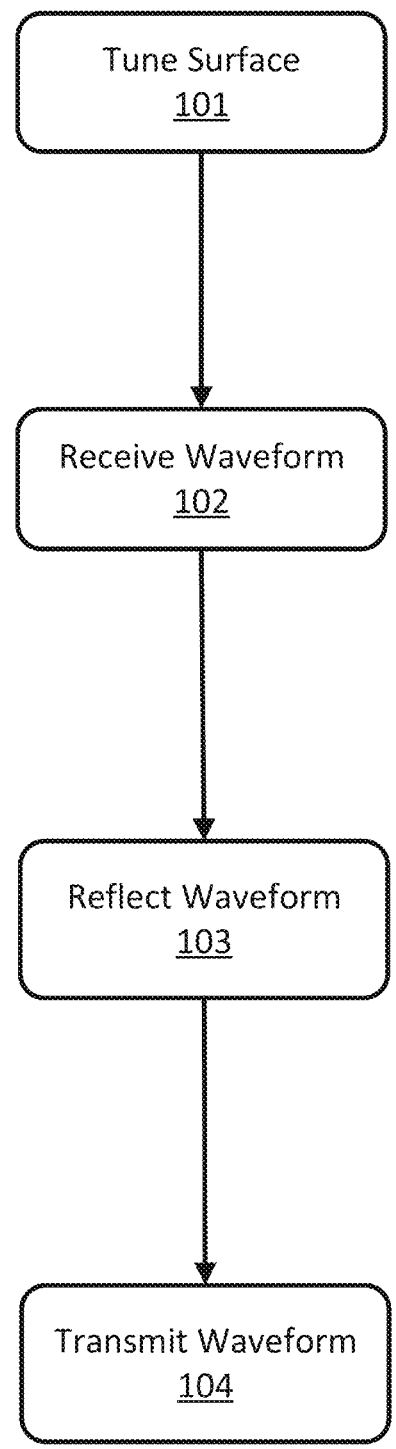
FIG. 1 illustrates a flow chart for a set of methods for shaping an electromagnetic wavefront in accordance with specific embodiments of the invention disclosed herein.

FIG. 1 illustrates a flow chart 100 for a set of methods for shaping an electromagnetic wavefront in accordance with specific embodiments of the invention disclosed herein. Each of the steps in the method are computer implemented and can be conducted by a system such as the system 200 for shaping an electromagnetic wavefront illustrated in FIG. 2. The set of methods in flow chart 100 begin with a step 101 of tuning a tunable surface in an electromagnetic cavity.

The cavities mentioned with respect to the various embodiments disclosed herein can have various characteristics. The cavities are electromagnetic cavities because a plurality of boundaries of each cavity interact with electromagnetic waves and cause reflections of those electromagnetic waves within the cavity. The cavity can be a cavity such as electromagnetic cavity 201 in FIG. 2. The cavity can include at least one semitransparent electromagnetic boundary, such as semitransparent electromagnetic boundary 203 in FIG. 2, and at least two opaque electromagnetic boundaries, such as the opaque electromagnetic boundaries that form the vertical walls 204 of electromagnetic cavity 201. The opaque electromagnetic boundaries can be metallic. The semitransparent electromagnetic boundaries can be regular or irregular patterned metallic surfaces such as grids, spirals, columns, rows, random shapes, or other patterns formed by the presence and absence of material.

The semitransparent electromagnetic boundaries mentioned with respect to the various embodiments disclosed herein can have various characteristics. The semitransparent electromagnetic boundaries can be partially transparent to electromagnetic waves and partially reflective of electromagnetic waves relative to the other boundaries of the electromagnetic cavity. The semitransparent electromagnetic boundaries can be semitransparent to electromagnetic waves having frequencies in the bandwidth of operation of the tunable surface contained with the cavity. The semitransparent electromagnetic boundary can admit an impinging electromagnetic wave or a retransmitted electromagnetic wave from the tunable surface. In specific embodiments of the invention, the semitransparent electromagnetic boundaries will also at least partially reflect electromagnetic waves within the cavity. A semitransparent electromagnetic boundary can be formed by an opening in a material of the electromagnetic cavity which is covered by a cover of semitransparent electromagnetic material. For example, the opening could be a cutout from a metallic sheet that forms a boundary of the cavity which is covered by a printed circuit board with a metallic pattern such as a capacitive or inductive grid.

In specific embodiments of the invention, the surface area of the openings in the cavity, which are covered by a semitransparent electromagnetic boundary can be selected to control the directivity of the electromagnetic wave shaping system. The limit of the directivity can be estimated by the formula 4π times the surface area of the openings in the given direction, divided by, the center wavelength of the bandwidth of operation of the tunable surface squared. As such, increasing the area of the openings tends to increase the directivity. However, in certain embodiments, making the area of the openings too large reduces the reflections inside the cavity and provides a lesser amount of control to the tunable surface in terms of modifying the polarization or beam direction of the outgoing electromagnetic waves. Changing the openings in the cavity also has an impact on the electromagnetic wavefront generated by the system such as the gain and shape and size of the main beam that is transmitted therefrom. As such, the surface area of the openings can be selected to maximize directivity while still achieving the degree of control and overall characteristics of the shaped electromagnetic wavefront that is desired to be transmitted from the electromagnetic wavefront shaping system.

In specific embodiments of the invention, the semitransparent electromagnetic boundaries can take on different characteristics. In specific embodiments of the invention, the semitransparent electromagnetic boundaries can be configured to modify electromagnetic wavefronts differently depending upon which way the wavefront is traveling (e.g., into or out of the cavity). In specific embodiments of the invention, the degree of transparency of the semitransparent electromagnetic boundaries can be selected to control the attenuation of the electromagnetic wave and the amount of energy that is kept within the cavity against the amount that is retransmitted from the cavity.

In specific embodiments of the invention, the tunable surface can take on different characteristics. The tunable surface can be inside an electromagnetic cavity such as tunable surface 202 in electromagnetic cavity 201 in FIG. 2. The tunable surface can be a metasurface. The tunable surface can retransmit electromagnetic waves that impinge upon the surface by retransmitting the electromagnetic waves through the tunable surface or by reflecting them off the surface. The tunable surface can be a transmitarray or a reflectarray. The tunable surface can be both transparent or semitransparent to specific electromagnetic waves and reflective to other electromagnetic waves.

In specific embodiments of the invention, the tunable surface can include a set of electromagnetic elements with configurable properties to tune the tunable surface. The set of electromagnetic elements can be a set of unit cells such as the unit cells 205 on tunable surface 202. The configurable properties can place the electromagnetic elements into two or more states. The states can differ in terms of the electromagnetic properties of the electromagnetic element (e.g., reflectance) and the impact the electromagnetic elements will have on an impinging electromagnetic wave in terms of the relative phase, polarization, direction, and amplitude of a retransmitted electromagnetic wave which results from the interaction of the electromagnetic element with the impinging electromagnetic wave. The pattern of states adopted by the set of electromagnetic elements on the tunable surface can be altered to tune the tunable surface. The electromagnetic elements can be controllable resonators on the tunable surface. The electromagnetic elements can be tunable components (e.g., pin diodes, varactor diodes, liquid crystals, phase change materials, microelectromechanical systems (MEMS), ferroelectric components, silicon-on-insulator complementary metal oxide semiconductor components, psuedomorphic high-electron-mobility-transistors (pHEMT), transistors of any kind, electrically actuated mechanical or solid-state switches of any kind, and other components). The electromagnetic elements can alter their states in response to an electronic signal provided to the tunable surface. For example, a control signal can bias a PIN diode in a reverse bias mode or a forward bias mode to alter the state of an associated electromagnetic element, or a control signal can open or close a switch to alter the state of an associated electromagnetic element. The states can be modified to change the standing wave pattern within the cavity to thereby alter the impact of the electromagnetic wavefront shaping system on an impinging electromagnetic wave.

The electromagnetic elements can be designed to minimally dissipate power which impinges upon the surface. At the same time, the electromagnetic elements can be designed to have a large variance in terms of their impact on alternative characteristics of an impinging electromagnetic wave in between their various states. The electromagnetic elements can be designed to have a large variance in terms of their impact on the phase of an impinging electromagnetic wave. For example, in one state, the electromagnetic element could create a 180-degree phase shift between an impinging and retransmitted electromagnetic wave and in another state the same electromagnetic element could not shift the phase between an impinging and retransmitted electromagnetic wave. In the alternative or in combination, the electromagnetic elements can be designed to have a large variance in terms of their impact on the beam direction of an impinging electromagnetic wave. For example, in the case of an electromagnetic element in the form of an electromagnetic switch, the switch can be in either an "off" or "on" state and alter an angle between an impinging electromagnetic wave and a retransmitted electromagnetic wave by 90 degrees or more between the two states.

The tunable surface can have various dimensions and the electromagnetic elements can be distributed on the tunable surface in various ways in different embodiments of the invention. The electromagnetic elements can be distributed along a two-dimensional planar or non-planar surface. The number of electromagnetic elements can be dependent on the desired performance of the electromagnetic wave shaping system and the area of the portions of the cavity that are covered by semitransparent areas. In specific embodiments, the number of electromagnetic elements is selected, with the area of each element taken as a given, such that the total area of the tunable surface occupied by electromagnetic elements equals the area of the portions of the cavity that are covered by semitransparent areas. In specific embodiments of the invention, the surface area of each electromagnetic element can be half of a wavelength by half of a wavelength where the wavelength is the wavelength of the center frequency of the bandwidth of operation of the tunable surface. In specific embodiments of the invention, the tunable surface can be sparsely covered by electromagnetic elements as compared to a cavity-less design while still achieving the same degree of wave shaping to the outgoing wave as a densely covered cavity-less tunable surface. This is because each electromagnetic element has a compounded impact on the impinging electromagnetic wave as it interacts not only with the single impinging electromagnetic wave but also with all its reflections.

Figure 2:
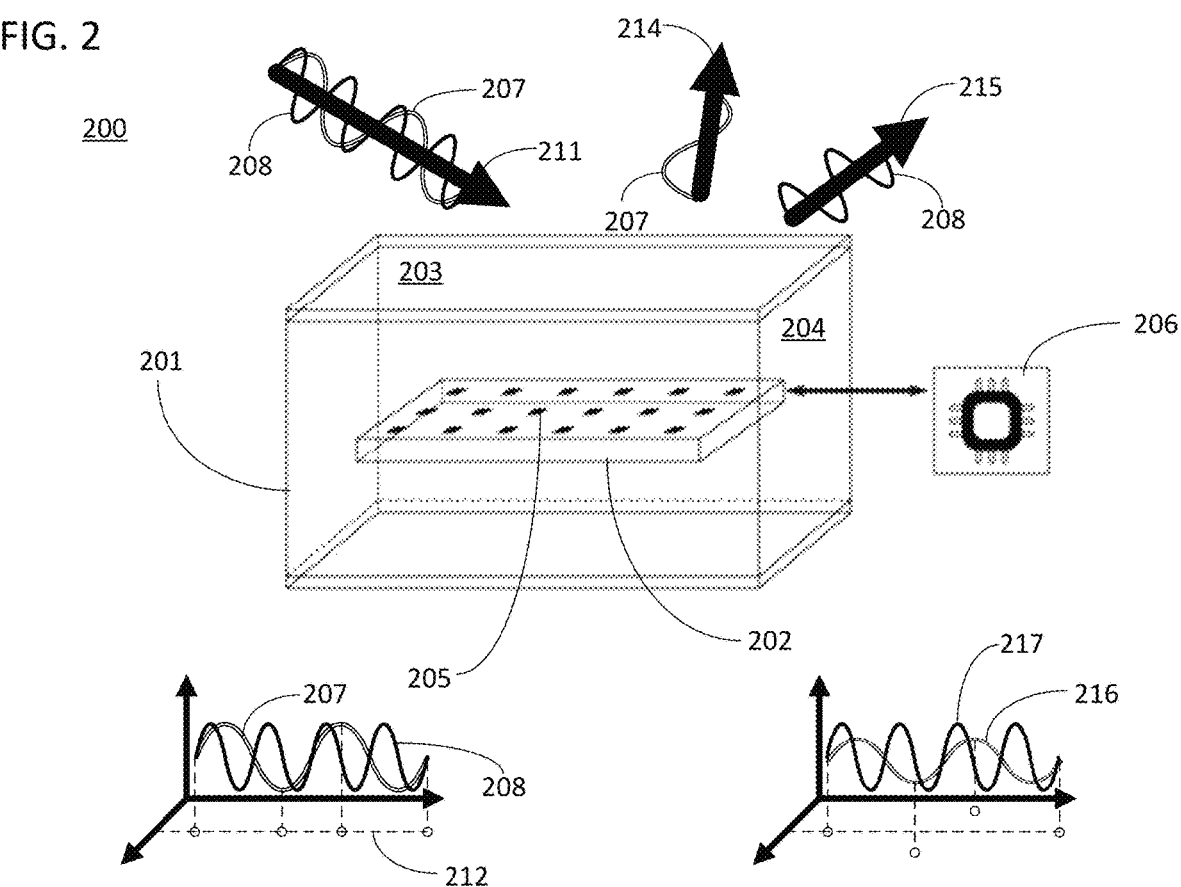
FIG. 2 illustrates an electromagnetic wavefront shaping system in accordance with specific embodiments of the invention disclosed herein.

In specific embodiments of the invention, the tunable surface can be controlled by an electronic controller. The tunable surface may be a solid-state device with the tuning of the surface conducted entirely through the application of voltages or currents to the tunable surface as controlled by a controller. Alternatively, or in combination, the tunable surface may have moving parts that are actuated through the transmission of electronic control signals by a controller. The tunable surface can include circuits placed directly on the tunable surface which are controlled by the controller. The circuits can include switches that alter a state of an electromagnetic element (e.g., a unit cell) on the tunable surface. The controller could be a microprocessor, microcontroller, application specific integrated circuit, or other electronic device capable of serving as a controller. These controllers can all include a processor for executing computer readable instructions and generating control signals for external systems such as transistors that control the flow of current to the unit cells of the tunable surface. The controller can include onboard electronic memory or access to external electronic memory. The electronic memory can be included in a set of at least one non-transitory computer readable media storing instructions that, when executed by the processor of the controller, allow the systems disclosed herein to execute the methods disclosed herein. The term processor is used herein in the broadest sense to include any hardware capable of executing instructions and includes traditional central processing unit a set of fixed logic gates that execute instructions embedded in the arrangement of the logic gates themselves, and any other computational system capable of generating output signals based on input signals in accordance with a state of the system. The state of the system can be defined by stored instructions. The controller can receive commands from an external source to configure the tunable surface. Alternatively, or in combination, the controller can receive sensor data from an external source and compute the appropriate configuration for the tunable surface using that sensor data. As illustrated in FIG. 2, the controller can be a controller 206 having a microcontroller with onboard memory which stores instructions for configuring the tunable surface.

In specific embodiments of the invention, a tuning step such as step 101 can be conducted at various chronological points relative to the other steps in flow chart 100. As illustrated, and since the tuning step will impact how the electromagnetic wavefront is shaped, the tunning step can be conducted ex ante before the electromagnetic wavefront is received in the electromagnetic cavity such as in a step 102. However, in specific embodiments of the invention, the step of tuning the tunable surface can be conducted after a wavefront has been received and retransmitted or while a wavefront is being received and retransmitted. For example, a system could measure the characteristics of a shaped electromagnetic wavefront as retransmitted from the cavity and use the measurement in a feedback loop to further tune the tunable surface to achieve a desired characteristic of the shaped electromagnetic wavefront. The feedback loop could be a closed form hard coded algorithmic control loop or could include a trained machine learning system that is designed to optimize the tuning of the surface for achieving specific shaped electromagnetic wavefront characteristics. In specific embodiments, the step of tuning the tunable surface could be done in an open loop fashion by pulling values for tuning the tunable surface from memory. In specific embodiments, either the source of the information regarding the feedback loop, or the inputs to an open loop control system, could be provided from either a source of the impinging electromagnetic wavefront or a receiver of the shaped electromagnetic wavefront. Embodiments in which an open loop system is used can increase the speed of operation of the electromagnetic wavefront shaping system in that the confirmations can be determined and stored in advance to be pulled from memory and applied to tune the tunable surface. In specific embodiments of the invention, the controller of the electromechanical wavefront shaping system can receive tuning commands from an external source to set the state of the tunable surface, or it can receive commands or data from which it will itself determine the appropriate configuration for the tunable surface.

Flow chart 100 further includes a step 102 of receiving an electromagnetic wavefront in an electromagnetic cavity. The electromagnetic wavefront can comprise a set of constituent electromagnetic waves at various frequencies. For example, the electromagnetic wavefront can include a first wave defined by a first wavelength and a second wave defined by a second wavelength. The various frequencies can be within a bandwidth of operation of the tunable surface (e.g., a bandwidth of frequencies for which the tunable surface is designed to interact with). The set of constituent electromagnetic waves in the received electromagnetic wavefront can have at least one of a shared polarization and shared beam direction. In keeping with the same example immediately above, the first wave and the second wave can have a shared polarization and a shared beam direction in the electromagnetic wavefront. The example in FIG. 2 shows a first wave 207 and a second wave 208 which form part of the same electromagnetic wavefront with first wave 207 having a first frequency and second wave 208 having a second frequency. As shown, the two waves have the same beam direction 211 and the same polarization 212. The electromagnetic wavefront can be received through a semitransparent electromagnetic boundary of the cavity. For example, the electromagnetic wavefront having the first wave 207 and second wave 208 can be received through semitransparent electromagnetic boundary 203.

Flow chart 100 further includes a step 103 of reflecting the electromagnetic wavefront within the cavity to repeatedly interact with the tunable surface. The step can involve the electromagnetic wavefront impinging upon the tunable surface and being retransmitted from the tunable surface by being either reflected by or retransmitted through the tunable surface. This retransmitted energy can then be reflected off the electromagnetic boundaries of the chamber, including, in some embodiments, at least partially off the at least one semitransparent electromagnetic boundary of the exterior chamber. In embodiments in which the electromagnetic wavefront that impinges upon the system remains constant and the tunable surface is held static during such time, the reflections can create a standing wave pattern in the cavity. If either the tunable surface is tuned or the characteristics of the impinging electromagnetic wavefront varies, the reflections can create a dynamic wave pattern in the cavity. As stated in the summary above, and as explained in more detail with respect to specific embodiments below, the reflections occurring in step 103 can cause the system to have differing impacts on different constituent electromagnetic waves of the electromagnetic wavefront. As a result, the electromagnetic wavefront can be retransmitted from the system as a shaped electromagnetic wavefront in which the different constituent electromagnetic waves have been modified in different ways.

Flow chart 100 further includes a step 104 of transmitting, after reflecting the electromagnetic wavefront within the cavity in step 103, the electromagnetic wavefront from the electromagnetic cavity as a shaped electromagnetic wavefront. The transmitting of the electromagnetic wavefront can be conducted using a semitransparent electromagnetic boundary of the electromagnetic cavity. For example, a shaped electromagnetic wavefront in FIG. 2 could be transmitted from electromagnetic cavity 201 through semitransparent electromagnetic boundary 203. In specific embodiments of the invention, the first wave and the second wave received in step 102 can have at least one of a difference in polarization or a difference in beam direction in the shaped electromagnetic wavefront. For example, as shown in FIG. 2, the first wave 207 and the second wave 208, when transmitted from electromagnetic cavity 201, have different beam directions 214 and 215. Alternatively, or in combination, first wave 207 and second wave 208 can have different polarizations 216 and 217. First wave 207 and second wave 208 are referred to as the same wave both in the impinging electromagnetic wavefront and the shaped electromagnetic wavefront in that they have the same frequencies in the impinging and shaped wavefronts.

Figure 3:
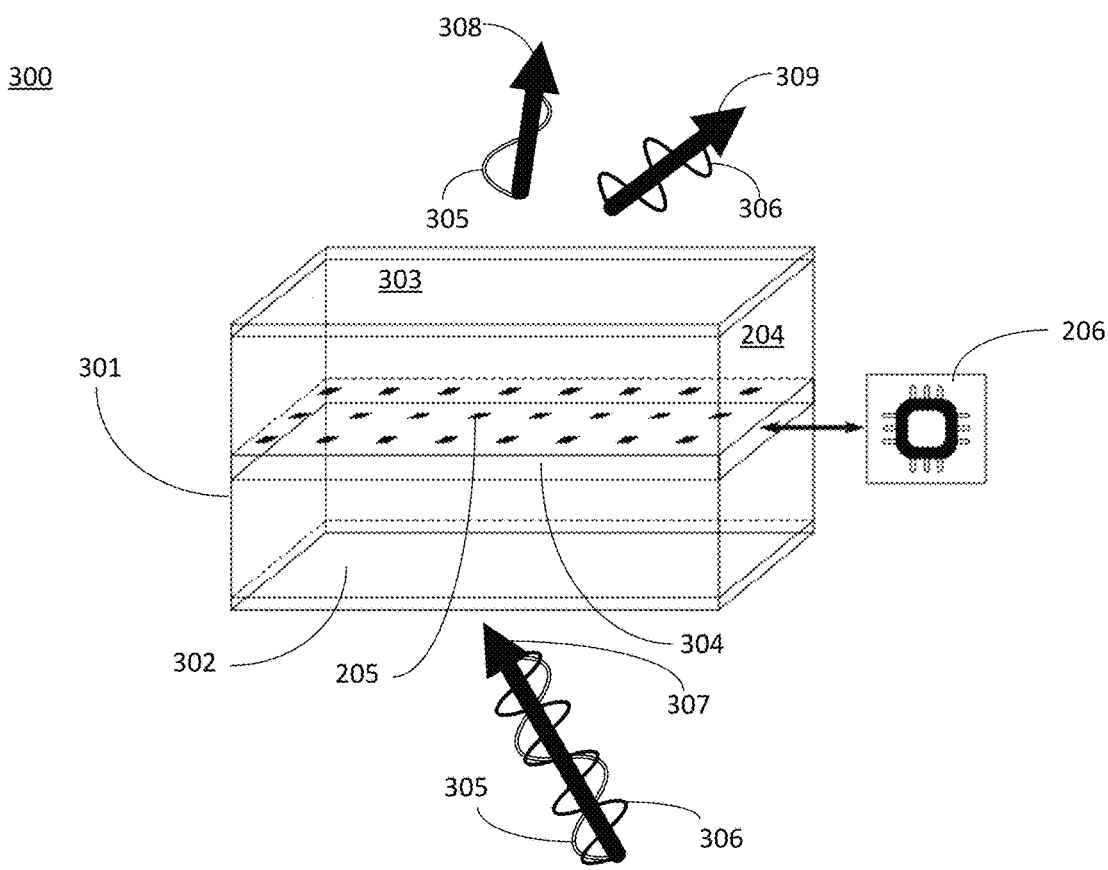
FIG. 3 illustrates an electromagnetic wavefront shaping system in the form of a cavity lens in accordance with specific embodiments of the invention disclosed herein.

FIG. 3 illustrates an electromagnetic wavefront shaping system 300 having similar characteristics to that of the system in FIG. 2 with the exception that in electromagnetic wavefront shaping system 300, the impinging electromagnetic wavefront and the shaped electromagnetic wavefront are received and transmitted through different sides of the cavity. In specific embodiments of the invention, the electromagnetic cavities disclosed herein can be cavity lens such as cavity lens 301. As illustrated, in these embodiments, the receiving of the electromagnetic wavefront, such as in step 102, can be conducted through a first side of the electromagnetic cavity, such as first side 302, and the transmitting of the shaped electromagnetic wavefront, such as in step 104, can be conducted through a second side of the electromagnetic cavity, such as second side 303. In these embodiments, the transmitting of the shaped electromagnetic wavefront can include retransmitting the impinging electromagnetic wavefront through the tunable surface. In specific embodiments of the invention, the first and second sides of the electromagnetic cavity can be opposite sides of the cavity, such as first side 302 and second side 303. In specific embodiments of the invention, the first and second sides can be electromagnetic semitransparent boundaries of the electromagnetic cavity. The first and second sides can be entirely formed of semitransparent material or include openings of semitransparent material formed in electromagnetically opaque material.

In specific embodiments of the invention in which the electromagnetic wavefront shaping system is operated as a cavity lens, the system can still utilize reflections within the cavity to, independently and simultaneously, control different constituent electromagnetic waves of an impinging electromagnetic wavefront. In specific embodiments of the invention, the tunable surface can be situated in a middle of the electromagnetic cavity, such as in the case of tunable surface 304, and operate in a transmitarray mode. In specific embodiments of the invention, the configuration of the system can still allow for reflections within the electromagnetic cavity, as in step 103 above, off of the semitransparent electromagnetic surfaces of the cavity as well as the opaque electromagnetic surfaces of the cavity. Furthermore, a first and second wave from an impinging electromagnetic wave, such as first wave 305 and second wave 306, can still be simultaneously and independently modified such that the first and second waves from the shaped electromagnetic wave differ in terms of their beam direction and/or polarization, as in the case of common beam directions 307 being altered to beam direction 308 and beam direction 309.

In specific embodiments of the invention in which the electromagnetic wavefront shaping system is operated as a cavity lens, the system can be utilized in various applications. For example, the cavity lens could be used in a radar system to modify incoming waves or outgoing waves to create different scan patterns for a radar target. As another example, the cavity lens could be used to shaped outbound or incoming waves for an antenna in a communications network. In either application, the cavity lens could be placed near an electromagnetic sensor or source of electromagnetic energy. As another example, the cavity lens could be used in a signal modifier such as an RIS and operate in a far field configuration in which incoming waves enter on one side, such as first side 302, and outgoing waves exit on the other side, such as second side 303. The RIS could be mounted on the wall of a room in a building that is within the range of a wireless communications network and be used to improve the performance of the wireless network by modifying the communication signals that pass through the cavity lens.

Figure 4:
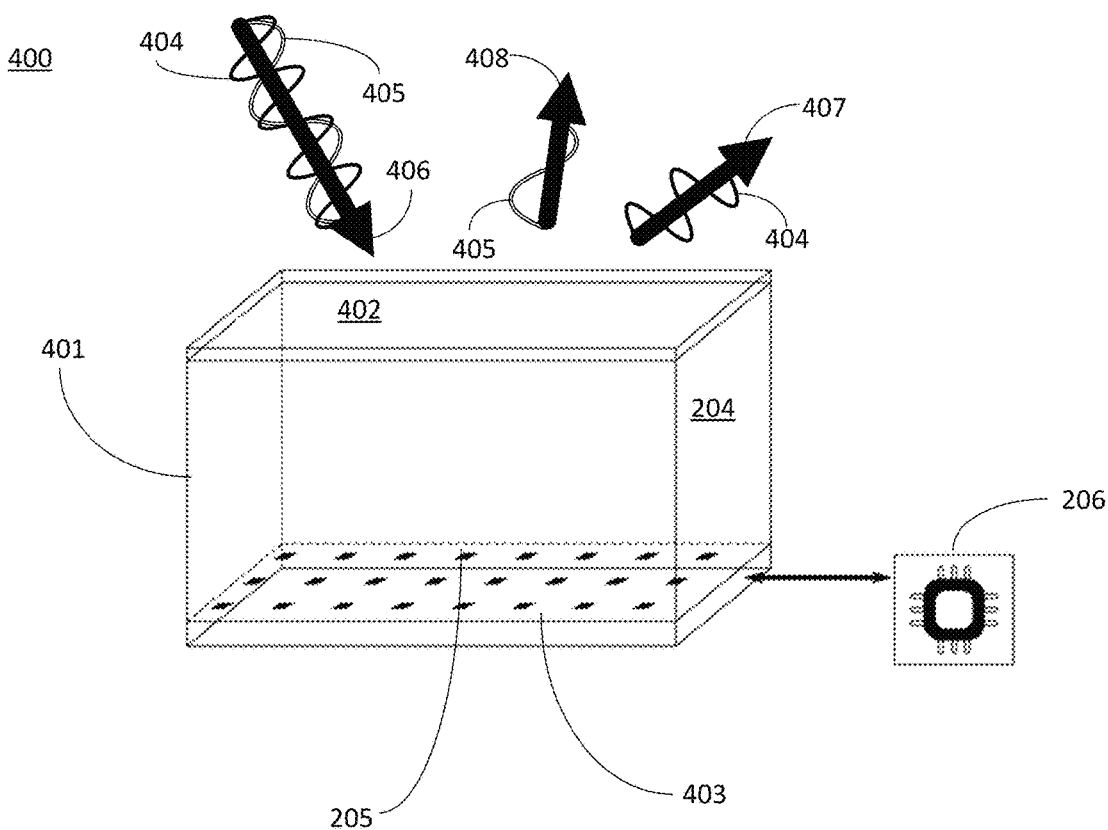
FIG. 4 illustrates an electromagnetic wavefront shaping system in the form of a cavity mirror in accordance with specific embodiments of the invention disclosed herein.

FIG. 4 illustrates an electromagnetic wavefront shaping system 400, having similar characteristics to that of the system in FIG. 2, which has been configured as a cavity mirror. In specific embodiments of the invention, the electromagnetic cavities disclosed herein can be cavity mirrors such as cavity mirror 401. As illustrated, in these embodiments, the receiving of the electromagnetic wavefront, such as in step 102, can be conducted through a first side of the electromagnetic cavity, such as first side 402, and the transmitting of the shaped electromagnetic wavefront, such as in step 104, can be conducted through the same side of the electromagnetic cavity, such as first side 402. The receiving of the electromagnetic wavefront and the transmitting of the shaped electromagnetic wavefront are both conducted through a first side of the electromagnetic cavity. In these embodiments, the transmitting of the shaped electromagnetic wavefront can include reflecting the impinging electromagnetic wavefront from the tunable surface. In specific embodiments of the invention, the first side can be an electromagnetic semitransparent boundary of the electromagnetic cavity. The first side can be entirely formed of semitransparent material or include openings of semitransparent material formed in electromagnetically opaque material. In these embodiments, all other boundaries of the cavity can be electromagnetically opaque.

In specific embodiments of the invention in which the electromagnetic wavefront shaping system is operated as a cavity lens, the system can still utilize reflections within the cavity to, independently and simultaneously, control different constituent electromagnetic waves of an impinging electromagnetic wavefront. In specific embodiments of the invention, the tunable surface can be situated at a bottom of the electromagnetic cavity opposite the side at which the impinging electromagnetic wavefront is received, such as in the case of tunable surface 403, and operate in a reflectarray mode. In specific embodiments of the invention, the configuration of the system can still allow for reflections within the electromagnetic cavity, as in step 103 above, off the semitransparent electromagnetic surface of the cavity as well as the opaque electromagnetic surfaces of the cavity. Furthermore, a first and second wave from an impinging electromagnetic wave, such as first wave 404 and second wave 405, can still be simultaneously and independently modified such that the first and second waves from the shaped electromagnetic wave differ in terms of their beam direction and/or polarization, as in the case of common beam directions 406 being altered to beam direction 407 and beam direction 408.

In specific embodiments of the invention, in which the electromagnetic wavefront shaping system is operated as a cavity mirror, the system can be utilized in various applications. For example, the cavity mirror could be used in a radar system to modify incoming waves from a source of electromagnetic radiation to be reflected out according to a desired scanning pattern. As another example, the cavity mirror could be used in a signal modifier such as an RIS and operate in a far field configuration in which incoming waves enter on one side, such as first side 402, and are reflected out as modified on that same side, such as first side 402. The RIS could be mounted on the wall of a room in a building that is within the range of a wireless communications network and be used to improve the performance of the wireless network by modifying the communication signals that pass through the cavity lens.

Figure 5:
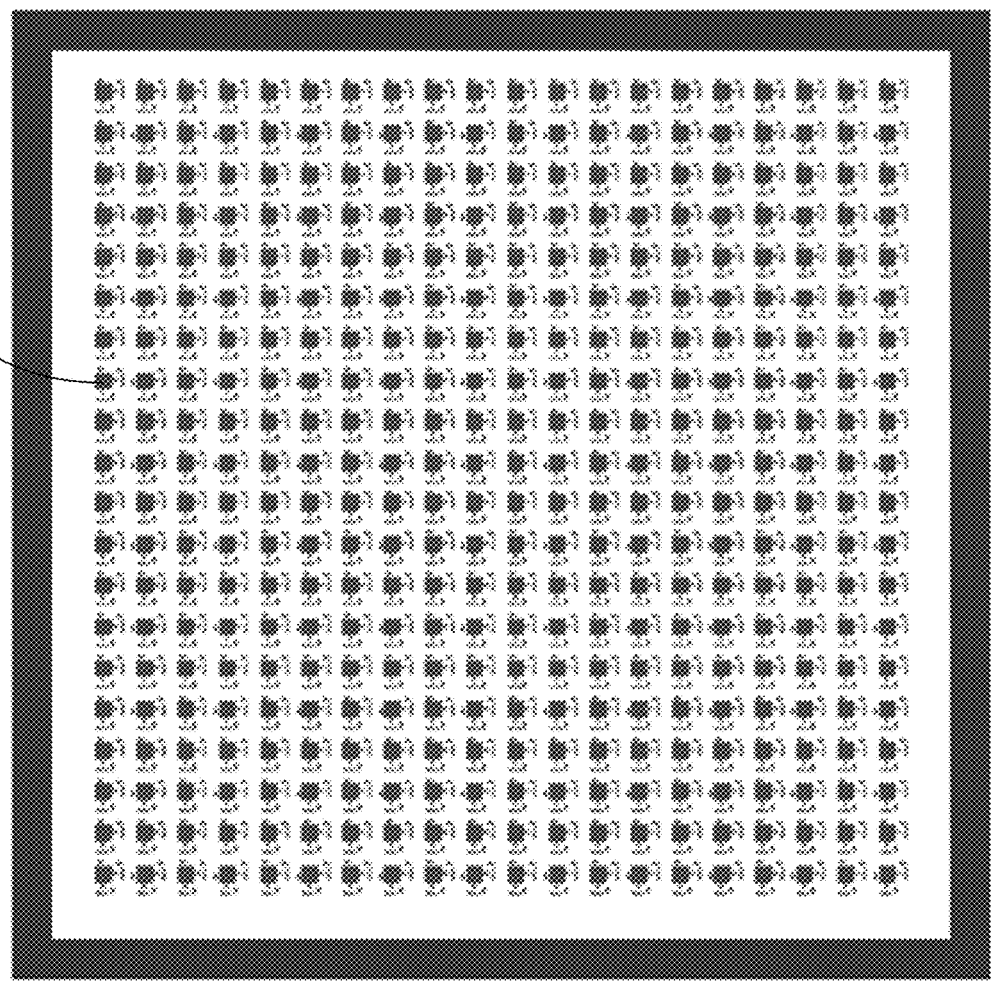
FIG. 5 illustrates a tunable surface and a set of associated configuration and beam patterns in accordance with specific embodiments of the invention disclosed herein.
Figure 5:
Figure 5:

FIG. 5 illustrates an example of a tunable surface 500 and a set of corresponding patterns 510 that can be used to explain further aspects of the tunable surfaces disclosed herein. The set of corresponding patterns 510 include a set of patterns for the states of the electromagnetic components on the tunable surfaces and a set of resulting beam patterns for the shaped electromagnetic wavefront. As stated above, a tunable surface in accordance with specific embodiments of the disclosures herein can include a set of electromagnetic components which can be configured into different states. Each electromagnetic component can exhibit two or more states which are either discontinuous or continuously variable with respect to the other states. The states can differ in terms of their impact on an impinging electromagnetic wave in terms of the phase, polarization, and amplitude of a resulting retransmitted electromagnetic wave. As a result, each electromagnetic component can have two or more potential impacts on the impinging electromagnetic wave which vary either continuously or discontinuously from state to state. The electromagnetic components can be passive elements, such as passive elements 501. The electromagnetic components can be arranged in a regular array, as illustrated by tunable surface 500, or be arranged irregularly on the tunable surface.

In specific embodiments of the invention, the electromagnetic components can be individually tuned, or tuned in groups, to exhibit different patterns defined by the states of the electromagnetic components on the tunable surface. A set of these patterns, such as pattern 511, are illustrated where each pixel of the pattern has a relative grey scale value associated with the state of the electromagnetic component (e.g., a unit cell) located at that point in the tunable surface. A set of corresponding patterns, such as pattern 512, are provided to show a beam pattern of the reflected electromagnetic wavefront. As shown, by altering the pattern of the states of the electromagnetic components, the beam pattern can be altered to change the direction of the reflected electromagnetic wavefront. Furthermore, as described above, using the approaches disclosed herein, different frequencies can be altered in different ways, simultaneously, by a tunable surface. In specific embodiments of the invention, these approaches can be used for beam forming, beam shaping, or beam steering by an electromagnetic wavefront shaping system in which beams are reflected from the tunable surface. These processes can involve forming different beams from a single incoming beam, changing the shape of the beam pattern to a desired pattern for specific frequencies, and redirecting different beams towards different directions. In specific embodiments of the invention, the forming, shaping, or steering can be conducted dynamically during the reception of an impinging electromagnetic wavefront. Using the approaches disclosed herein different patterns for the states of the electromagnetic components will lead to multiple different patterns for the various constituent electromagnetic waves of the impinging electromagnetic wavefront.

In specific embodiments of the invention, various approaches can be used to determine the configuration of the tunable surface to achieve a desired shaping result. For example, these methods can be used to determine the pattern of configurations (e.g., pattern 511) to achieve a desired characteristic of the transmitted shaped electromagnetic wavefront (e.g., pattern 512). For example, three approaches can be used to determine a configuration of tunable surface in order to control multiple output beams. The multiple output beams are examples of the set of electromagnetic waves that are altered by the tunable surface to form the shaped electromagnetic wavefronts described herein. The approaches are an experimental approach, a numerical approach, and an experimental-numerical approach.

In an experimental approach, a wave shaping device can be placed inside of an anechoic chamber, where there are several probe antennas available (the number of probe antennas equals to the desired number of beams to control). Probe antennas are positioned in the desired directions of outgoing beams. If an electromagnetic wave shaping system is configured with a wave injection port, a vector network analyzer can be used in order to measure the transmission coefficient between the electromagnetic wave shaping system and probe antennas. If an electromagnetic wave shaping system is configured as a cavity mirror or a cavity lens, another probe antenna can be used to generate incoming beams. In these cases, a vector network analyzer can be used in order to measure the transmission coefficient between a probe antenna generating incoming beams and probe antennas corresponding to outgoing beams. A vector network analyzer and an electromagnetic wave shaping system can be connected to and controlled by a PC. By changing a configuration of a tunable surface and measuring the corresponding change in the transmission coefficients, different optimization procedures (e.g., genetic algorithm, particle swarm optimization, etc.) can be implemented to maximize a goal function. A goal function is selected to maximize the performance of outgoing beams towards probe antennas. An example of a goal function in the case when there are two incoming electromagnetic waves at frequencies f1 and f2 and two outgoing beams could be=mean(abs(S21))_f1+mean(abs(S31))_f2−abs(mean(abs(S21))_f1−mean(abs(S31))_f2), where S21 is a transmission coefficient measured by a vector network analyzer between an electromagnetic wave shaping system and probe antennas, and where S31 is a transmission coefficient measured between a probe antenna generating incoming beams and probe antennas corresponding to outgoing beams. The mean (abs(S21))_f1 is the average over the frequency band around the central frequency f1 and mean(abs(S21))_f2 is the average over the frequency band around the central frequency f2. The parameters would be used to maximize the value of the goal function.

In a numerical approach, a precise model of a wave shaping device is built and allows one to predict the radiation pattern of a wave shaping device depending on parameters of incoming beams and a configuration of a tunable surface. The numerical model with optimization algorithms mentioned above can be used in order to control multiple beams. In an experimental-numerical approach, a numerical model is built based on experimental characterization of a wave shaping device. The model is then used as in the strictly numerical approach in order to determine the device parameters for a desired wavefront shaping result.

Figure 6:
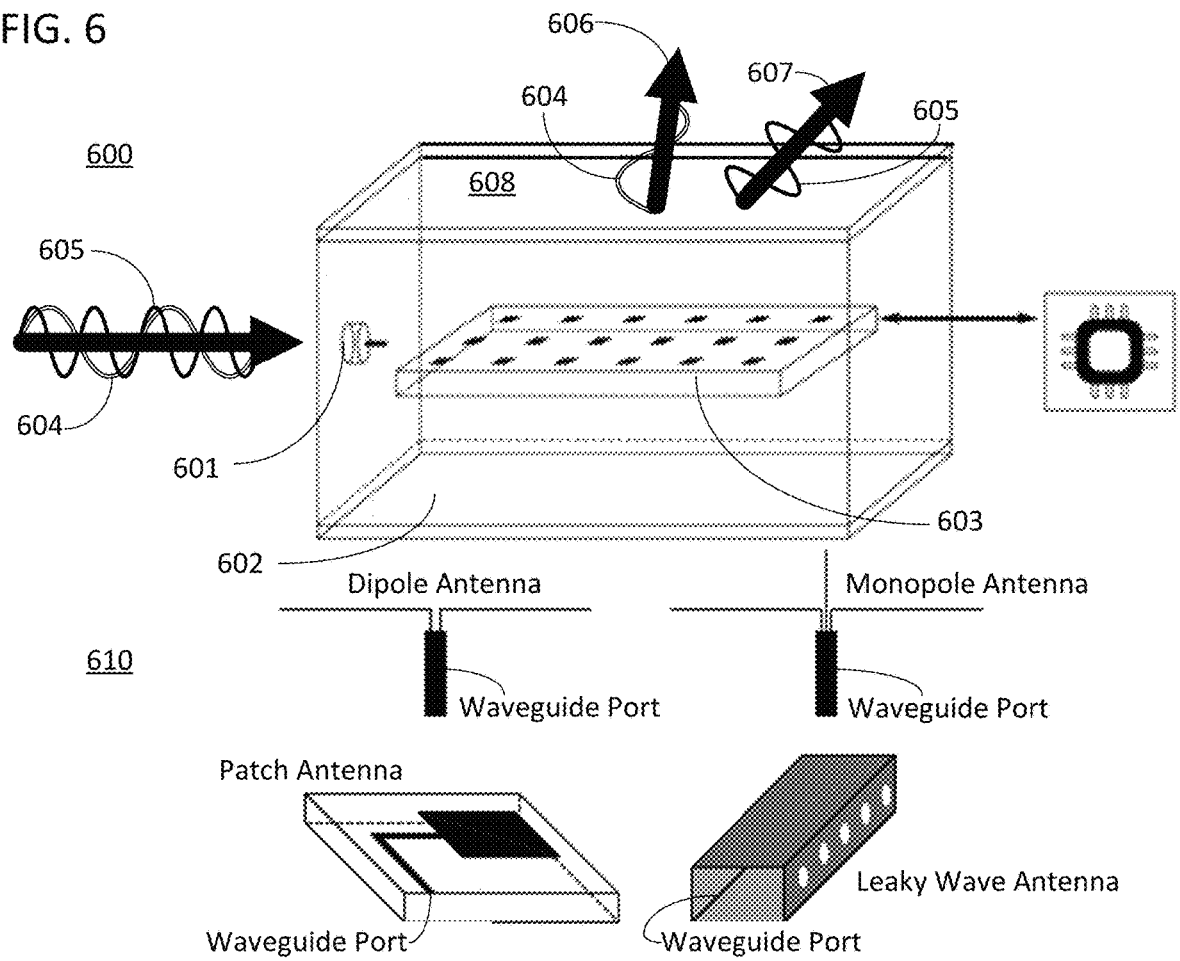
FIG. 6 illustrates an electromagnetic wavefront shaping system having an injection port in accordance with specific embodiments of the invention disclosed herein.

FIG. 6 illustrates an electromagnetic wavefront shaping system 600, having similar characteristics to that of the system in FIG. 2, which has been configured to operate with a wave injection port 601 to receive the incoming electromagnetic wavefront. In specific embodiments of the invention, the receiving of an electromagnetic wavefront in step 102 can be conducted using a wave injection port of an electromagnetic cavity. For example, the electromagnetic wavefront can be a wavefront injected into cavity 602 via wave injection port 601. The injection port can be formed in any side of the cavity relative to the tunable surface in the cavity. However, as illustrated, the wave injection port 601 is coupled to cavity 602 on a side of the cavity in line with tunable surface 603. The injection port can include a waveguide inserted through the port and be formed in an electromagnetic opaque boundary of the cavity. The wave injection port 601 can be coupled to an antenna from set 610 and be used to inject an electromagnetic wavefront having a first wave 604 and a second wave 605 into cavity 602. The antenna can be a dipole antenna, patch antenna, horn antenna, leaky wave antenna, or monopole antenna for receiving an electromagnetic wavefront and injecting into the cavity via a connected waveguide and the injection port. The antenna can also be an array of any of the above-mentioned antennas. The waveguide could be a parallel plate waveguide.

In specific embodiments of the invention, an electromagnetic wavefront shaping system with an injection port for receiving an electromagnetic wavefront can independently and simultaneously alter the characteristics of two or more constituent electromagnetic waves in the electromagnetic wavefront. As illustrated, the injection port receives an electromagnetic wavefront with a first wave 604 and a second wave 605 with each wave having a different frequency but the same direction and polarization. The cavity can include multiple electromagnetic opaque boundaries and at least one electromagnetic semitransparent boundary such as semitransparent boundary 608. In these embodiments, the electromagnetic wavefront injected into the cavity will still be reflected within the cavity, as in step 103, and will also be retransmitted out of the cavity as a shaped electromagnetic wavefront, as in step 104. The shaped electromagnetic wavefront can be transmitted through a semitransparent boundary such as semitransparent boundary 608. In specific embodiments of the invention, the shaped electromagnetic wavefront that is transmitted from the cavity can be transmitted out with the first wave and the second wave having different beam directions. For example, first wave 604 has a first beam direction 606 and second wave 605 has a second beam direction 607. The first and second waves could also differ in terms of their phase or polarization in the shaped electromagnetic wavefront. In these embodiments, while the two different waves are shown as exiting the cavity with a beam direction extending through the same boundary of the cavity, in alternative embodiments the first and second waves could be transmitted from the cavity with beam directions that extend through different boundaries of the cavity such as opposite sides of the cavity.

Figure 7:
FIG. 7 illustrates a set of semitransparent electromagnetic boundaries in accordance with specific embodiments of the invention disclosed herein.
Figure 7:
Figure 7:
Figure 7:
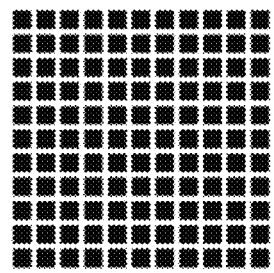
Figure 7:
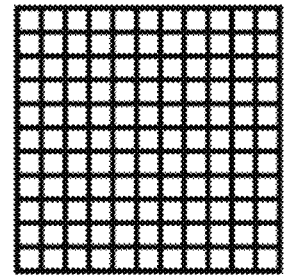

Specific embodiments of the semitransparent electromagnetic boundaries disclosed herein can be described with reference to FIG. 7. As stated above, the semitransparent surfaces can be designed to minimize absorption of impinging electromagnetic energy. Furthermore, the semitransparent electromagnetic boundaries can be designed to be selective in terms of what electromagnetic wavefronts reflect off the boundaries or are retransmitted through the boundaries. The semitransparent electromagnetic boundaries can have fixed or dynamic properties such that their electromagnetic characteristics and selectivity can remain the same or change over time as the system is in operation. This selectivity can impact the quality factor of the cavity by controlling the degree by which the semitransparent electromagnetic boundaries allow energy to be transmitted from the cavity or reflect energy back into the cavity.

In specific embodiments of the invention, the semitransparent electromagnetic boundaries can be designed to have selectivity properties that are either fixed or dynamically variable. In specific embodiments, the surfaces can be selective as to far field and near field electromagnetic wavefronts such that far field waves are reflected or retransmitted and near field electromagnetic wavefronts are treated oppositely. The boundaries could treat electromagnetic waves exiting or entering the cavity in the same manner (e.g., reflect all near field electromagnetic waves whether they are incoming or outgoing, and retransmitted through all far field electromagnetic waves whether they are incoming or outgoing). In specific embodiments of the invention, the boundaries can be selective as to the characteristics of the electromagnetic waves that impinge upon the boundaries in terms of their direction, polarization, phase, frequency, etc. In specific embodiments of the invention, the boundaries can be selective as to the relative direction of the electromagnetic waves such that they are designed to be semitransparent only for transmission (e.g., in the case of a cavity with an injection port), or only for reception (e.g., in the case of the receiving surface of a cavity lens). In specific embodiments, the boundaries can be selective as to the relative direction with respect to the angle at which the electromagnetic wave is impinging upon the surface (in combination with or in the alternative to being selective with respect to which side the electromagnetic wave is impinging upon the boundary from). For example, a semitransparent electromagnetic boundary used to couple incoming and outgoing waves can be additionally designed to provide angular selectivity such that the boundary provides full retransmission through the boundary for a normally impinging electromagnetic wave and partial retransmission through the boundary for electromagnetic waves impinging at other angles.

In specific embodiments of the invention, the semitransparent electromagnetic boundaries can have different compositions and configurations in order to achieve a desired selectivity, level of energy absorption, and other characteristics. The semitransparent electromagnetic boundaries could include opaque electromagnetic material with cut outs that are covered by semitransparent electromagnetic covers or could be entirely formed of semitransparent electromagnetic material. The semitransparent electromagnetic boundaries could include one or more printed circuit boards (PCB) with patterned metal layers formed thereon. The PCBs could be low-loss RF substrates. The total thickness of the PCB, or stack thereof, could be on the order of a tenth of the wavelength of the center frequency of the bandwidth of operation of the tunable surface. A single-face PCB can be used to realize a semitransparent surface, where only the amplitude of the transmission coefficient can be arbitrarily controlled. The amplitude and the phase of the reflection coefficient in this case are dependent on the selected transmission coefficient. The transmission coefficient can be engineered by selecting appropriate geometrical parameters of a pattern applied to the metallic layer of a PCB. For example, single-face PCB 700 includes a single patterned metal layer shown by the thick black line. A double-face PCB having different metallic patterns on two faces of an RF substrate. This realization of a semitransparent surface allows one to have a limited independent control over the amplitude of the transmission coefficient and the phase of the reflection coefficient. For example, double-face PCB 701 includes two patterned metal layers. A three-face PCB represented by a stack-up of two RF substrates with three differently patterned metallic layers. This realization of a semitransparent surface allows one to have a fully independent control over the amplitude of the transmission coefficient and the phase of the reflection coefficient. As another example, triple-face PCB 702 includes three patterned metal layers. The patterns on each metal layer could be the same and be aligned, could be the same and be offset, or could be entirely different. For example, one of the patterned metal layers could be a capacitive grid such as capacitive grid 703 in which the black areas represent metal. As another example, one or more of the patterned metal layers could be an inductive grid such as inductive grid 704 in which the black areas represent metal. In contrast, an opaque electromagnetic boundary could be a solid sheet of metal.

In specific embodiments of the invention, the quality factor of the cavity should be adjusted to assure that power is not unnecessarily dissipated by the cavity. However, in specific embodiments of the invention, a desire to keep the quality factor high can lead to a decrease in the degree of control provided by the system. As mentioned above, an increase in the amount of reflections increases the impact of the tunable surface in shaping the shaped electromagnetic signal. However, an increase in the amount of reflections also decreases the quality factor of the cavity in that energy is absorbed with each imperfect reflection or other retransmission of energy in the cavity. In specific embodiments of the invention, both beneficial aspects of the design can be met when a ratio of an amount of electromagnetic energy of the wavefront stored in the cavity to an amount of electromagnetic energy of the wavefront radiated outside of the cavity is greater than 10 and less than 1000. The amount of electromagnetic energy of the wavefront radiated outside of the cavity can include an amount of electromagnetic energy of the shaped electromagnetic wavefront.

In specific embodiments, the quality factor will also have an impact on the frequency of coherence by which the different frequencies of the first and second waves that will be treated separately by the electromagnetic wave shaping system must differ. In specific embodiments, the frequency of coherence will be equal to the center frequency of the bandwidth of operation of the tunable surface divided by the quality factor. Therefore, to have control over a large range of frequencies, the quality factor should be selected to be fairly large.

Figure 8:
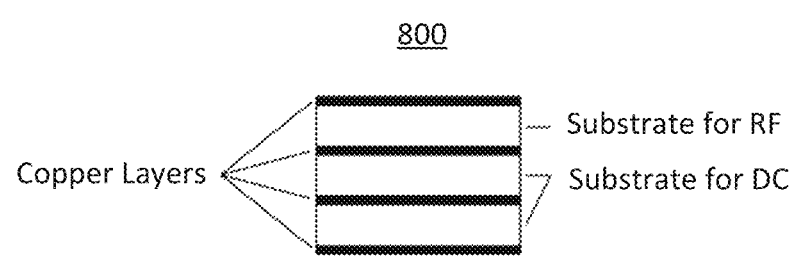
FIG. 8 illustrates a cross section of a tunable surface in accordance with specific embodiments of the invention disclosed herein.

In specific embodiments of the invention, the quality factor of the electromagnetic cavity will depend on the dissipation of the tunable surface and the amplitude of the transmission coefficient of the one or more semitransparent boundaries of the cavity. The semitransparent boundary and the tunable surface characteristics can be considered in combination to affect the quality factor of the electromagnetic cavity. A tunable surface in accordance with specific embodiments of this disclosure can include a radio frequency (RF) substrate with a dielectric constant of approximately 3 and a dissipation factor on the order of $10^{-4}$. The thickness of the RF substrate can depend on the center frequency of the bandwidth of operation of the electromagnetic wavefront shaping system and can be on the order of one tenth of the wavelength of that center frequency of the bandwidth of operation of the electromagnetic wavefront shaping system (e.g., 1 mm for a 30 GHz signal). FIG. 8 illustrates a PCB stack up for a tunable surface 800 which will be used as a reflectarray (e.g., in the cavity mirror implementation discussed above). As illustrated, the tunable surface 800 includes a radio frequency substrate which is generally a low-loss dielectric and at least one DC substrate. The DC substrate can be a low-cost substrate in that it does not require low-loss materials. A semitransparent electromagnetic boundary can be selected based on the dissipation factor of the tunable surface and designed with the various factors discussed above with reference to FIG. 7. Additionally, the dissipation of the tunable surface should be considered because the amount of power dissipated by the tunable surface will increase with each reflection. As such, the amplitude of the transmission coefficient of the semitransparent boundary should be selected to increase the amount of control afforded by the tunable surface while not increasing the reflections so much that power is overly dissipated in the chamber due to the increased reflections. For example, if the tunable surface dissipated 2 dB of power per reflection, the amplitude of the transmission coefficient of the one or more semitransparent boundaries should be adjusted to around 0.7 to achieve a quality factor of around 100 for the electromagnetic cavity.

Figure 9:
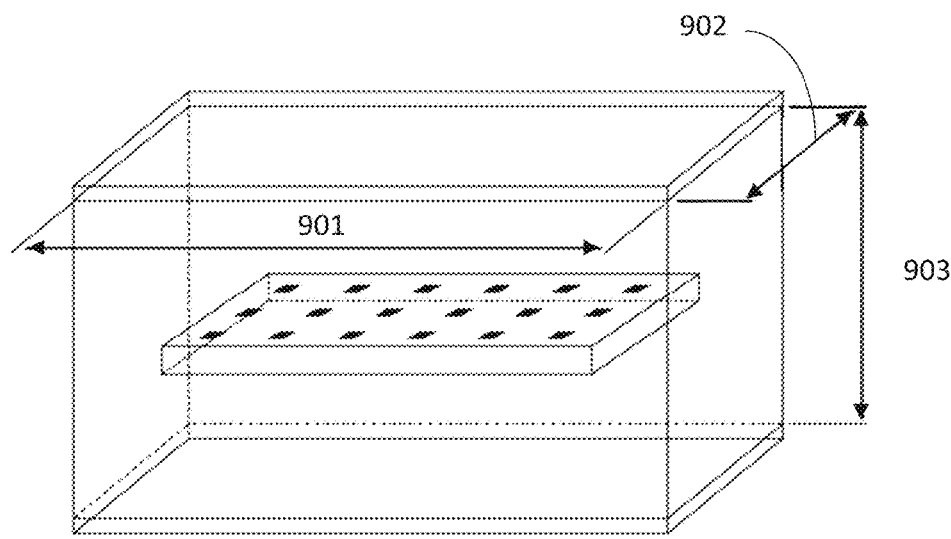
FIG. 9 illustrates the dimensions of an electromagnetic wavefront shaping system in accordance with specific embodiments of the invention disclosed herein.

FIG. 9 illustrates the dimensions of an electromagnetic wave shaping system 900 that is similar to system 200 in FIG. 2. The cavity includes a cavity length 901, a cavity depth 902, and a cavity thickness 903. In specific embodiments of the invention, the cavity length and depth determine parameters of the transmitted shaped electromagnetic wavefront and depend on the desired performance of the overall wavefront shaping device. In specific embodiments the thickness of the cavity determines the correlation length between neighboring tunable elements. The thicker the cavity, the larger the correlation length and the better control of the electromagnetic field can be achieved inside the cavity. A thickness on the order of 10 wavelengths of the center frequency of operation of the tunable surface can provide a device that is compact while still providing sufficient correlation length to achieve high performance depends. In specific embodiments, a thickness on the order of 100 such wavelengths provide a high degree of control but is far less compact. However, in applications that are less space intensive, a thicker cavity can be used. In specific embodiments of the invention, a first wavelength of a first wave such as first wave 207 can be shorter than a second wavelength of a second wave such as second wave 208. In these embodiments, the electromagnetic cavity can have a cavity thickness 903 where the thickness is greater than or equal to half of the first wavelength and less than or equal to one hundred times the first wavelength. In specific embodiments of the invention, the thickness can be less than or equal to ten times the first wavelength of the first wave.

Figure 10:
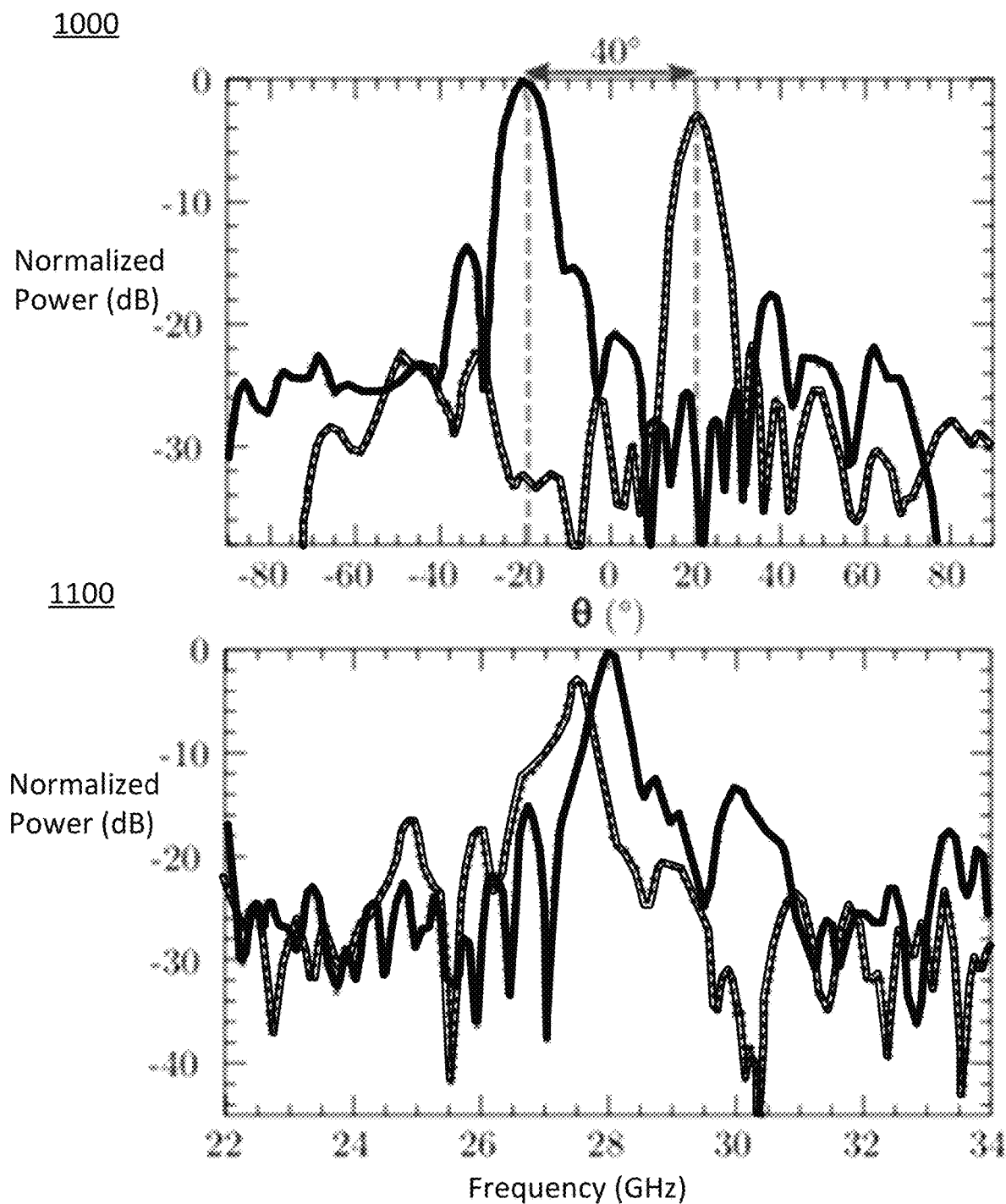
FIG. 10 illustrates radiation patterns measured at two different frequencies for a Ka band wave shaping system with an injection port transmitting two beams at those two different frequencies in accordance with specific embodiments of the invention disclosed herein.

In specific embodiments of the invention, the tunable surface and overall electromagnetic wavefront shaping system can be designed to have a bandwidth of operation in the Ku, Ka, Q, V, or W bands such that the multiple electromagnetic waves that are independently and separately modified by the system can have wavelengths in any one of those bands. FIG. 10 illustrates experimental results for a Ka band electromagnetic wavefront shaping system configured to operate with an injection power which transmits two different beams at two different frequencies. The plot 1000 shows a radiation pattern measurement of the two frequencies against an angle sweeping through the radiation pattern. The plot 1100 shows the frequency response of the electromagnetic wavefront shaping system when provided with an electromagnetic wave at those frequencies. As seen, the two frequencies are separated by less than 1 GHz around a center frequency of around 27.75 GHz. The resulting direction of the electromagnetic waves at the two frequencies is starkly different with the peak power of each electromagnetic wave being separate by a full 40 degrees across the beam pattern.

In specific embodiments of the invention, the same cavity can accept multiple electromagnetic wavefronts at the same time and the wavefronts can be in the various frequency bands described above. As such, step 102 can include simultaneously receiving a set of additional electromagnetic wavefronts in the electromagnetic cavity with the electromagnetic wavefront described above, and step 104 can include simultaneously transmitting a set of additional shaped electromagnetic wavefronts from the electromagnetic cavity with the shaped electromagnetic wavefront described above.

The ability to process multiple electromagnetic wavefronts and multiple electromagnetic wavefronts in different frequency bands using an electromagnetic wavefront shaping system can provide significant benefits in various applications. For example, such an electromagnetic wavefront shaping system can be part of a radar system. The radar can be configured to transmit multiple beams using the same transmit antenna module and receive multiple beams using one or more receiver antenna modules in different directions. When the radar is configured to use multiple beams, each beam individually has worse characteristics (beam width in elevation and azimuth, side lobe level, etc.) than if the radar were configured to use a single beam. The advantage of using multiple beams is that it is possible to scan the frontal scene differently and define areas of interest much more quickly, even though the radar will have to spend more time identifying and collecting all the information from these areas. For example, it is possible to scan the scene from both sides with a crossover in the middle or decide to split the radar antenna into several zones where each zone will scan a different part of the scene. Each beam can be set at different frequencies within the functional frequency band. The main frequency band that can be used for radar applications can be: C band: 4 GHz to 8 GHz (satellite transponders, weather radar, etc.); X band: 8 Ghz to 12.5 GHz (missile guidance, military radar, weather radar, ground surveillance radar, etc.); Ku band: 12.5 GHz to 18 GHz (missile guidance, High resolution mapping, satellite altimetry, etc.); Ka band: 27 GHz to 40 GHz (Mapping, short range, airport surveillance, etc.); or W band: 75 GHz to 110 GHz (Automotive radar, high resolution meteorological observation, imaging radar, etc.). By changing the frequency of each beam, different types of information and characteristics of the front scene can be collected. For example, it is possible to divide an automotive radar antenna into two parts. In the first part, 76 GHz beams are used to scan the frontal scene and quickly identify areas of interest with lower resolution, and then a second part of the antenna with 80 GHz beams are used to scan in the identified areas and gather maximum information with better resolution. In alternative embodiments, multiple beams at different frequencies could be used for interleaved radar modes. For example, a radar sequence for both short-range and long-range modes could be done at the same time. The short-range mode could use 77 GHz beams with specific characteristics (number of chirps, chirp length, . . . ) and the long-range mode could use 79 GHz beams with other characteristics. Each radar mode could have specific functional and performance requirements to meet. The number of beams per radar mode may be different because the field of view (FOV) could also be different (e.g., FOV of +/−60° for short range mode and +/−10° for long range mode). Another example of the multi-beam applications for imaging radars is to use two beams at different frequencies in the functional frequency band to image the scene. Each beam could collect different information about the same scene and the radar could then be able to use all information from both images taken to get a clearer picture of the scene. This could help to identify false alarms and reinforce targets of interest.

Figure 11A:
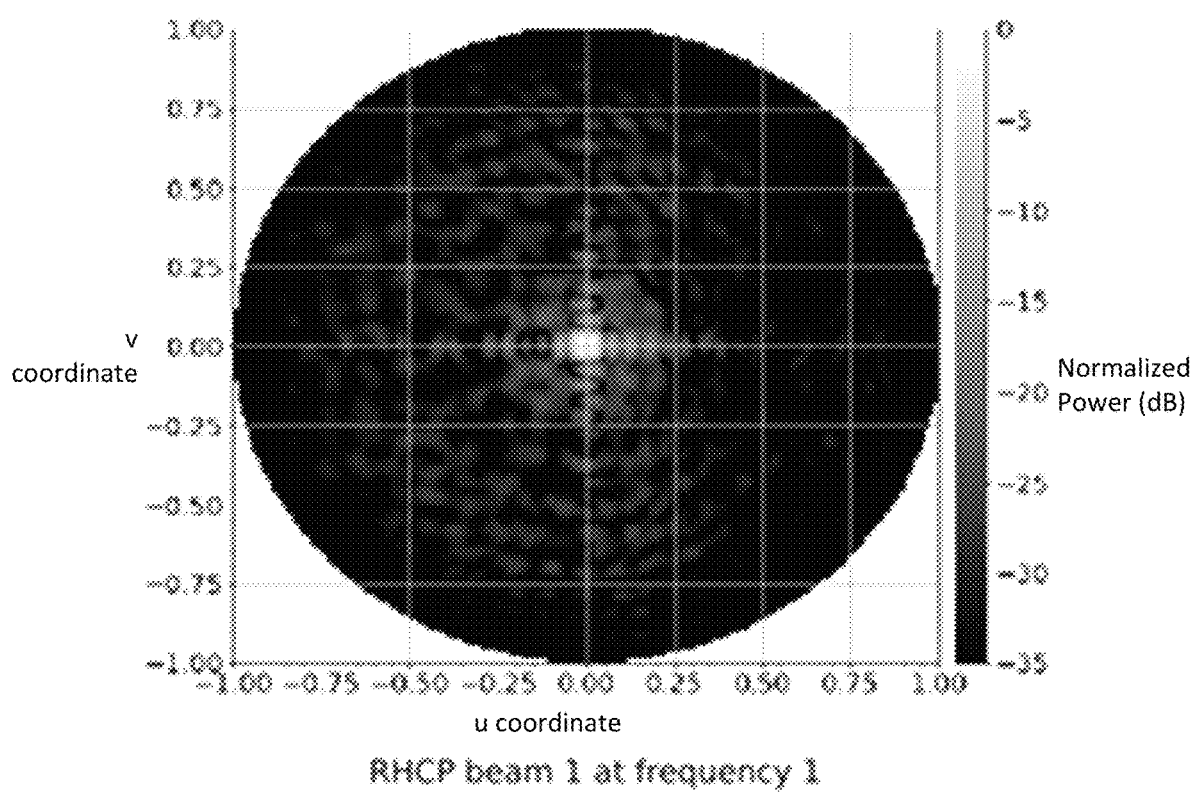
FIGS. 11A and 11B illustrates the measured simultaneous generation of two beams with different polarizations including a first beam at a first frequency having right-hand circular polarization (RHCP) and a second beam at a second frequency having left-hand circular polarization (LHCP) in accordance with specific embodiments of the invention disclosed herein.
Figure 11B:
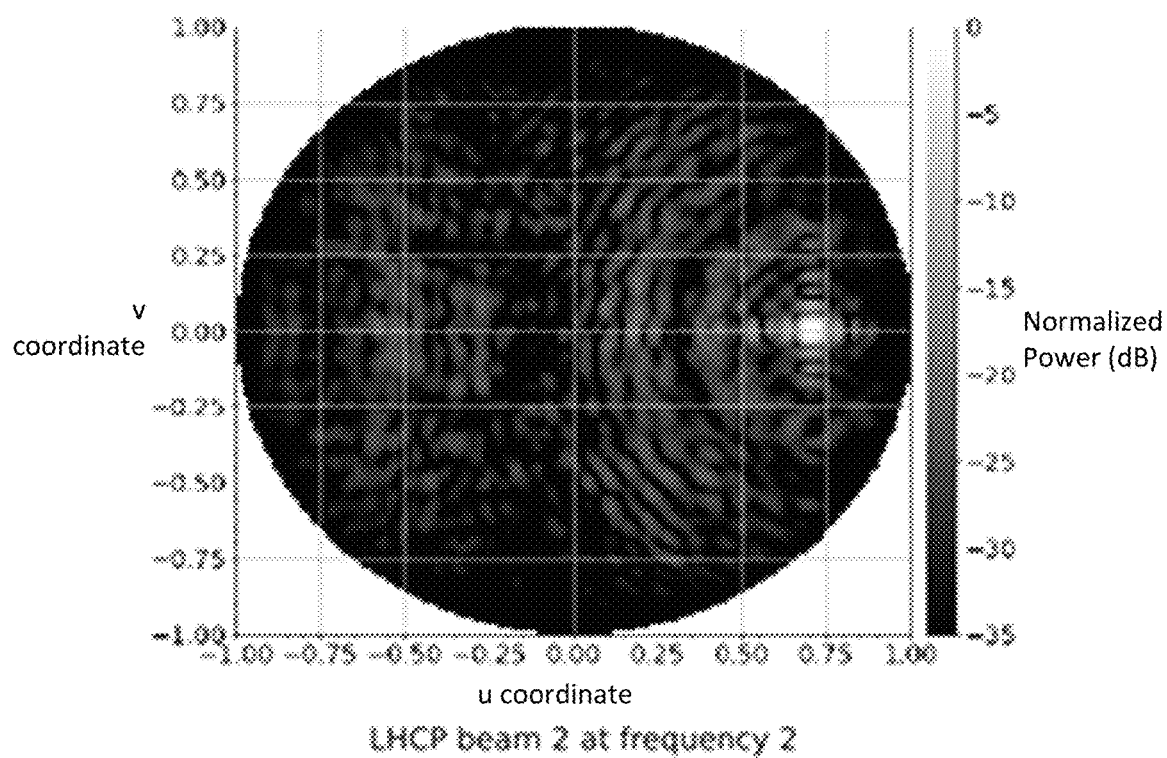

In specific embodiments of the invention, the electromagnetic wavefront shaping system will produce different polarizations for the different electromagnetic waves of the shaped electromagnetic wavefront. Such a system could likewise be used in a radar application. One polarization used on the radar can provide a certain image of the front scene. Another type of polarization on the same scene will pick up additional information that was not present with the first polarization. This means that depending on the polarization used by the radar, the environment illuminated by the radar will not reflect the radar waves in the same way. Some polarizations are more suitable for specific environments. In some cases, selecting a specific polarization will help you detect objects in strong environmental situations (rain, snow, hail, etc.). Depending on how the object is illuminated by the radar, the reflection (RCS: Radar Cross Section) will be higher or lower depending on the polarization selected by the radar. Accordingly, changing the polarization of the radar can provide more signals from the target. In some situations, changing the polarization can also help distinguish between several targets that are close to each other. For a 1D radar antenna, a flexible waveguide that is capable of providing both horizontal and vertical polarization without interaction issues can be utilized along with specific connectors working with the flexible waveguide solution and adapted to an antenna module and radar board. Another application of the flexible waveguide solution is to use this plastic waveguide on 2 antenna modules at the same time. A flexible waveguide will be connected on one side to the radar board on a transmission channel for instance, and then connected on the other side to the input of a RF splitter. The first output of the RF splitter will be connected to the first antenna module which will use the horizontal polarization for instance. The second output of the RF splitter will then be connected to another flexible waveguide, connected to the second transmit antenna module which will use the second polarization (vertical). FIGS. 11A and 11B illustrate the measured simultaneous generation of two beams with different polarizations including a first beam at a first frequency having right-hand circular polarization (RHCP) in plot 1100 and a second beam at a second frequency having left-hand circular polarization (LHCP) in plot 1110 in accordance with specific embodiments of the invention disclosed herein. The diagrams show normalized power in decibels across the beam diagram with darker coloring indicating higher power. The u value is the cosine of alpha and v value is the cosine of beta in a standard alpha, beta, gamma three-dimensional angle breakdown of the beam pattern.

In specific embodiments of the invention, an electromagnetic wavefront shaping system can be used as a signal modifier such as an RIS in a communications network. The communication can be a local or wide area wireless network including a home or building WiFi network or a cellular network such as a 4G or 5G network. The RIS can be part of an internet of things (IoT) system such as one providing sensor data and data transfer capabilities between connected devices. The RIS can compensate for "dead spots" in the network (i.e., areas with weak electromagnetic signal). The RIS can provide the ability to increase the signal strength between wireless access points such as between user equipment and base stations or between base stations. User equipment can be a mobile phone, laptop, IoT device, robot, car etc. The source can be a base station of the mobile operator or signal from satellite provider or another user equipment. The RIS can be installed in or attached to the internal walls of a building, be strategically placed outdoors in trouble spots for wireless networks such as in the openings and exists of automobile tunnels or the tops of canyons or valleys, be connected to telephone poles, electric transmission line towers or other structures, or be built into existing wireless network infrastructure such as radio antennas, cell towers, and base stations.

The RIS can be a passive or active device in terms of the emission of the radiofrequency signal. If RIS is a passive device—than RIS reflects the electromagnetic signal in one or more directions in order to connect one or more points in the space and restore the path for electromagnetic wave between emitters and receivers of the signal. Several RISs can be also used to increase the length of the path. A passive RIS doesn't emit electromagnetic signal itself but re-emits it due to reflection. An active RIS can receive a signal, amplify it, and emit in a required direction. A passive RIS can consist of a receiving antenna and can optionally have an amplifier and has emitting antenna. The signal can then be received by the receiving antenna, amplified (if the RIS has an amplifier), and emitted by emitting antenna in a required direction.

Figure 12:
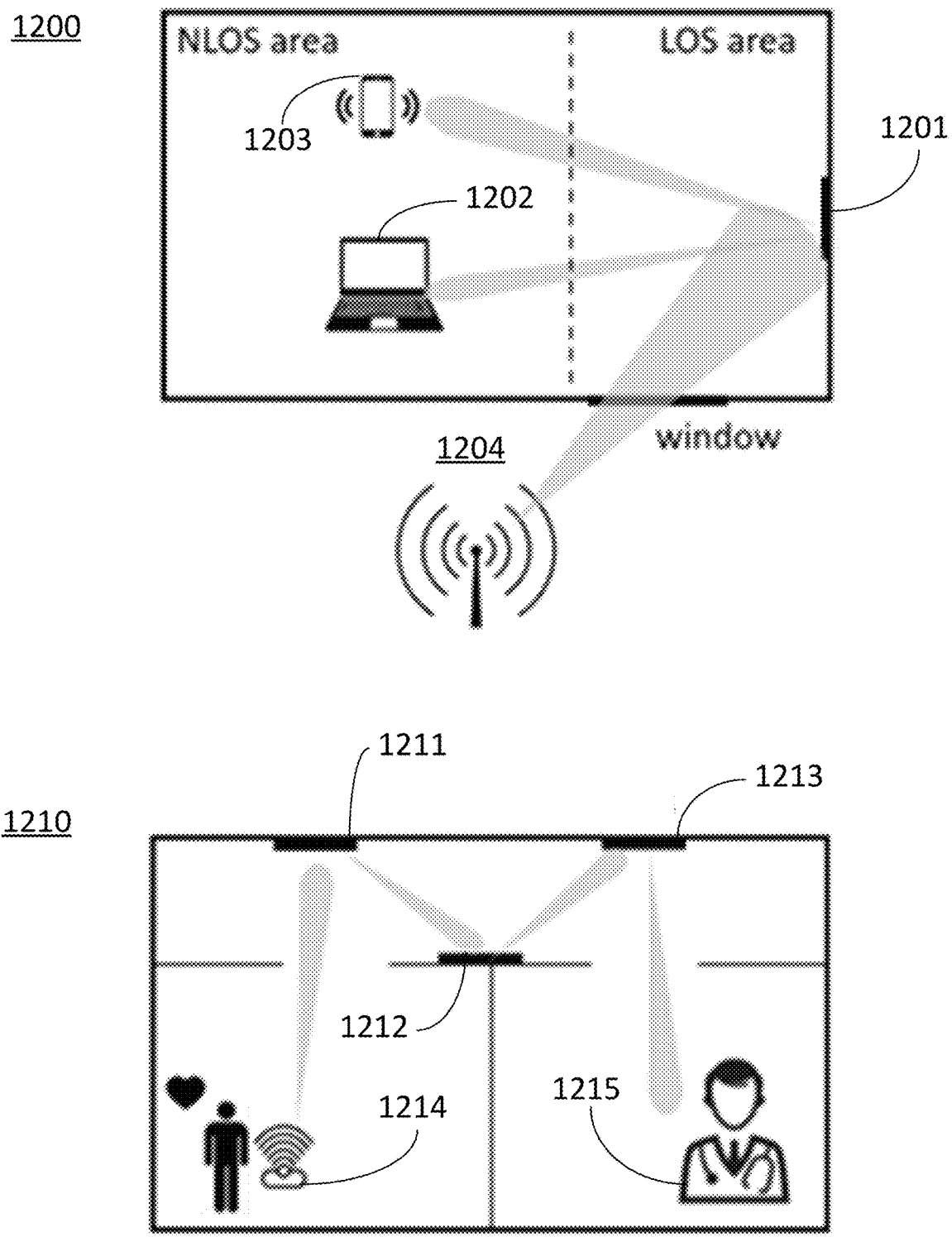
FIG. 12 illustrates an electromagnetic wavefront shaping system being used in two different communication networks in accordance with specific embodiments of the invention disclosed herein.

Example of RISs in operation in accordance with specific embodiments of the invention disclosed herein is provided in FIG. 12. The RIS 1201 in diagram 1200 restores the signal of a wide area wireless network by providing different signals to a first user equipment 1203 and a second user equipment 1202 from the base station 1204 outside of the building. As seen in the drawing, the same RIS 1201 can provide different frequencies to the two different user equipment devices with different beam directions from a common source signal. This could be beneficial in situations in which the two devices were using different baseband frequencies to communicate with the same base station. Diagram 1210 includes several RISs (e.g., RIS1 1211, RIS2 1212, and RIS3 1213). In this situation, the multiple RIS devices are used to restore signal between IoT device (e.g., a health control or monitoring system 1214) and another UE (for example, connected equipment 1215 operated by a medical professional).

In specific embodiments of the invention, the systems disclosed herein can be used in additional methods. The methods can include a step of improving a range or a fidelity of a wireless communication network using the disclosed electromagnetic wavefront shaping devices. In these approaches, the wavefront received in step 102 could be a wavefront in a communication signal of the wireless communication network and the electromagnetic cavity could form a part of an RIS for the wireless communication network.

In specific embodiments of the invention, the systems disclosed herein can be used as part of a wireless network. In these embodiments, the systems disclosed herein can be used in additional methods. The methods can also include receiving a pilot electromagnetic wavefront in the electromagnetic cavity, reflecting the pilot electromagnetic wavefront within the cavity, and transmitting, after reflecting the pilot electromagnetic wavefront within the cavity, the pilot electromagnetic wavefront from the electromagnetic cavity as a shaped pilot electromagnetic wavefront. The electromagnetic cavity can be part of a wireless network access point. The tuning of the tunable surface could be conducted based on the transmitting of the pilot electromagnetic wavefront. In these embodiments, the network equipment that detects the shaped signal resulting from the pilot signal could be used to generate information to tune the tunable surface for the next transmission using the electromagnetic wavefront shaping system. The information could be a parameter describing the received signal such as a quality or amplitude of the signal carried in the pilot wave. The pilot wave could include a known encoding or other calibration signal to determine how accurately the signal was received.

The spatial/polarization/frequency beams splitting techniques disclosed herein may be beneficial in different communication/power exchange scenarios. For example, in specific embodiments of the invention, the electromagnetic wavefront shaping system could be used as part of a satellite communication ground station user terminal, a ground gateway, or a satellite. As another example, the systems and methods could be used for make before you break satellite switching. To provide a solid connectivity with a satellite, a 'make before you break' switching process can be used. This implies the switching of the antenna beam between 2 or more satellites ensuring that not a single data unit is lost and the quality of service is not impacted in a noticeable way. For this purpose, more than one beam is used to track more than one satellite. The connection priority is then switched between the satellites to provide non-interrupting connectivity. As another example, the systems and methods could be used for simultaneous GEO+MEO connectivity. To increase the coverage and data rate, several beams can be used to provide the connectivity between different satellite orbits. This can be combinations like GEO+MEO, GEO+LEO, LEO+MEO and any other. As another example, the systems and methods could be used for simultaneous cellular/satellite communication. To provide stable terrestrial coverage, the connection with different communication providers can be established with different beams. This may include the combination of cellular network (e.g., 5G, 6G etc.) and satellite networks (e.g., GEO/MEO/LEO). As another example, the systems and methods could be used for satellite/earth connectivity. As another example, the beam splitting can be used to provide the simultaneous operation of the same satellite antenna to communicate between satellites in the constellation as well as between satellites and user terminal on the earth, as well as between satellites at different orbits. As another example, the systems and methods could be used for IoT applications that require a simultaneous data exchange between multiple devices. This may include different scenarios such as communication between ensemble of devices within indoor and outdoor environments. As another example, the systems and methods could be used for beam frequency and direction splitting to provide simultaneous power and data exchange. This can be used for example to charge the device within one channel and provide communication within a different beam of different channel. As another example, the systems and methods could be used to provide communication between cellular base stations within 5G/6G networks or between base station and users or between base stations and access point extenders or between base stations and RIS. As another example, the systems and methods could be to provide communication between devices operating at different communication standards (e.g., WiFi/Bluetooth/LoRa, GPS etc.) As another example, the systems and methods could be used for providing integrated sensing and communication regime for simultaneous data exchange and sensing capabilities.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. Although examples in the disclosure where generally directed to communication antennas, radars, and signal modifiers, the same approaches could be utilized to any electromagnetic wave shaping task. Furthermore, while the examples in the disclosure were generally directed to electromagnetic wave shaping in the radio frequency bands, many of the concepts disclosed herein are more broadly applicable to wave shaping of and signal including optical, ultraviolet, infrared, and various other types of wavefronts. These and other modifications and variations to the present invention may be practiced by those skilled in the art, without departing from the scope of the present invention, which is more particularly set forth in the appended claims

What is claimed is:

1. A method for shaping an electromagnetic wavefront, comprising:
    tuning a tunable surface in an electromagnetic cavity;
    receiving the electromagnetic wavefront in the electromagnetic cavity, wherein the electromagnetic wavefront includes a first wave defined by a first wavelength and a second wave defined by a second wavelength, and wherein the first wave and the second wave have a shared polarization and a shared beam direction in the electromagnetic wavefront;
    reflecting the electromagnetic wavefront within the electromagnetic cavity to repeatedly interact with the tunable surface; and
    transmitting, after reflecting the electromagnetic wavefront within the electromagnetic cavity, the electromagnetic wavefront from the electromagnetic cavity as a shaped electromagnetic wavefront, wherein the first wave and the second wave have at least one of a difference in polarization or a difference in beam direction in the shaped electromagnetic wavefront.

2. The method of claim 1, wherein:
the tuning adjusts a reflectance of a set of controllable resonators on the tunable surface.

3. The method of claim 1, wherein:
the tunable surface is a reflectarray.

4. The method of claim 1, wherein:
the tunable surface is a transmitarray.

5. The method of claim 1, wherein:
the electromagnetic cavity is a cavity lens;
the receiving of the electromagnetic wavefront is conducted through a first side of the electromagnetic cavity;
the transmitting of the shaped electromagnetic wavefront is conducted through a second side of the electromagnetic cavity; and
the first side and the second side of the electromagnetic cavity are opposite sides of the electromagnetic cavity.

6. The method of claim 1, wherein:
the electromagnetic cavity is a cavity mirror; and
the receiving of the electromagnetic wavefront and the transmitting of the shaped electromagnetic wavefront are both conducted through a first side of the electromagnetic cavity.

7. The method of claim 1, wherein:
the receiving of the electromagnetic wavefront is conducted using a wave injection port of the electromagnetic cavity.

8. The method of claim 1, wherein:
the transmitting of the electromagnetic wavefront is conducted using a semitransparent electromagnetic boundary of the electromagnetic cavity.

9. The method of claim 1, wherein:
the first wavelength is shorter than the second wavelength;
the electromagnetic cavity has a thickness;
the thickness is greater than or equal to half of the first wavelength; and
the thickness is less than or equal to one hundred times the first wavelength.

10. The method of claim 9, wherein:
the thickness is less than or equal to ten times the first wavelength.

11. The method of claim 1, wherein:
the first wavelength and the second wavelength are in one of the Ku, Ka, Q V, and W bands.

12. The method of claim 1, wherein:
a ratio of an amount of electromagnetic energy of the electromagnetic wavefront stored in the electromagnetic cavity to an amount of electromagnetic energy of the electromagnetic wavefront radiated outside of the electromagnetic cavity is greater than 10 and less than 1000; and
the amount of electromagnetic energy of the electromagnetic wavefront radiated outside of the electromagnetic cavity includes an amount of electromagnetic energy of the shaped electromagnetic wavefront.

13. The method of claim 1, further comprising:
improving a range or a fidelity of a wireless communication network using the electromagnetic cavity;
wherein the electromagnetic wavefront is a communication signal of the wireless communication network; and
wherein the electromagnetic cavity forms part of a reconfigurable intelligent surface for the wireless communication network.

14. The method of claim 1, further comprising:
receiving a pilot electromagnetic wavefront in the electromagnetic cavity;
reflecting the pilot electromagnetic wavefront within the electromagnetic cavity; and
transmitting, after reflecting the pilot electromagnetic wavefront within the electromagnetic cavity, the pilot electromagnetic wavefront from the electromagnetic cavity as a shaped pilot electromagnetic wavefront;
wherein the electromagnetic cavity is part of a wireless network access point; and
wherein the tuning of the tunable surface is conducted based on the transmitting of the pilot electromagnetic wavefront.

15. The method of claim 1, further comprising:
simultaneously receiving a set of additional electromagnetic wavefronts in the electromagnetic cavity with the electromagnetic wavefront; and
simultaneously transmitting a set of additional shaped electromagnetic wavefronts from the electromagnetic cavity with the shaped electromagnetic wavefront;
wherein the electromagnetic cavity is part of a radar.

16. The method of claim 1, wherein:
the electromagnetic cavity is part of a satellite communication ground station user terminal, a ground gateway, or a satellite.

17. A system for shaping an electromagnetic wavefront, comprising:
an electromagnetic cavity having at least one semitransparent electromagnetic boundary;
a tunable surface in the electromagnetic cavity;
at least one processor; and
at least one computer readable medium storing instructions that, when executed by the at least one processor, cause the system to:
tune the tunable surface in the electromagnetic cavity;
receive an electromagnetic wavefront in the electromagnetic cavity, wherein the electromagnetic wavefront includes a first wave defined by a first wavelength and a second wave defined by a second wavelength, and wherein the first wave and the second wave have a shared polarization and a shared beam direction in the electromagnetic wavefront;
reflect the electromagnetic wavefront within the electromagnetic cavity; and
transmit, after reflecting the electromagnetic wavefront within the electromagnetic cavity, the electromagnetic wavefront from the electromagnetic cavity through the at least one semitransparent electromagnetic boundary as a shaped electromagnetic wavefront, wherein the first wave and the second wave have at least one of a difference in polarization or a difference in beam direction in the shaped electromagnetic wavefront.

18. The system of claim 17, wherein:
the tuning adjusts a reflectance of a set of controllable resonators on the tunable surface.

19. The system of claim 17, wherein:
the tunable surface is one of: (i) a reflectarray; and (ii) a transmitarray.

20. The system of claim 17, wherein:
the electromagnetic cavity is a cavity lens;
the receiving of the electromagnetic wavefront is conducted through a first side of the electromagnetic cavity;
the transmitting of the shaped electromagnetic wavefront is conducted through a second side of the electromagnetic cavity; and
the first side and the second side of the electromagnetic cavity are opposite sides of the electromagnetic cavity.

21. The system of claim 17, wherein:
the electromagnetic cavity is a cavity mirror; and
the receiving of the electromagnetic wavefront and the transmitting of the shaped electromagnetic wavefront are both conducted through a first side of the electromagnetic cavity.

22. The system of claim 17, wherein:
the receiving of the electromagnetic wavefront is conducted using a wave injection port of the electromagnetic cavity.

23. The system of claim 17, wherein:
the transmitting of the electromagnetic wavefront is conducted using a semitransparent electromagnetic boundary of the electromagnetic cavity.

24. The system of claim 17, wherein:
the first wavelength is shorter than the second wavelength;
the electromagnetic cavity has a thickness;
the thickness is greater than or equal to half of the first wavelength; and
the thickness is less than or equal to one hundred times the first wavelength.

25. The system of claim 24, wherein:
the thickness is less than or equal to ten times the first wavelength.

26. The system of claim 17, wherein:
a ratio of an amount of electromagnetic energy of the electromagnetic wavefront stored in the electromagnetic cavity to an amount of electromagnetic energy of the electromagnetic wavefront radiated outside of the electromagnetic cavity is greater than 10 and less than 1000; and
the amount of electromagnetic energy of the electromagnetic wavefront radiated outside of the electromagnetic cavity includes an amount of electromagnetic energy of the shaped electromagnetic wavefront.

27. The system of claim 17, further comprising:
improving a range or a fidelity of a wireless communication network using the electromagnetic cavity;
wherein the wavefront is a communication signal of the wireless communication network; and
wherein the electromagnetic cavity forms part of a reconfigurable intelligent surface for the wireless communication network.

28. The system of claim 17, further comprising:
receiving a pilot electromagnetic wavefront in the electromagnetic cavity;
reflecting the pilot electromagnetic wavefront within the electromagnetic cavity; and
transmitting, after reflecting the pilot electromagnetic wavefront within the electromagnetic cavity, the pilot electromagnetic wavefront from the electromagnetic cavity as a shaped pilot electromagnetic wavefront;

wherein the electromagnetic cavity is part of a wireless network access point; and wherein the tuning of the tunable surface is conducted based on the transmitting of the pilot electromagnetic wavefront.

29. The system of claim 17, further comprising:

simultaneously receiving a set of additional electromagnetic wavefronts in the electromagnetic cavity with the electromagnetic wavefront; and simultaneously transmitting a set of additional shaped electromagnetic wavefronts from the electromagnetic cavity with the shaped electromagnetic wavefront;

wherein the electromagnetic cavity is part of a radar.

30. A method for shaping an electromagnetic wavefront, comprising:

tuning a tunable surface in an electromagnetic cavity;

receiving, in the electromagnetic cavity, electromagnetic energy comprising a set of electromagnetic waves having a set of frequencies, a shared polarization, and a shared beam direction;

reflecting the set of electromagnetic waves within the electromagnetic cavity such that the electromagnetic waves interact with the tunable surface; and transmitting, out of the electromagnetic cavity and after reflecting the set of electromagnetic waves within the electromagnetic cavity, at least a portion of the electromagnetic energy comprising electromagnetic waves having the set of frequencies and at least one of: (i) a set of differing polarizations; and (ii) a set of differing beam directions.

* * * * *